United States Patent
Fong et al.

(10) Patent No.: US 11,422,865 B2
(45) Date of Patent: Aug. 23, 2022

(54) DYNAMIC WORKLOAD MIGRATION TO EDGE STATIONS

(71) Applicant: EMC IP Holding Company LLC, Hopkinton, MA (US)

(72) Inventors: Victor Fong, Medford, MA (US); Kenneth Durazzo, San Jose, CA (US)

(73) Assignee: EMC IP HOLDING COMPANY LLC, Hopkinton, MA (US)

(*) Notice: Subject to any disclaimer, the term of this patent is extended or adjusted under 35 U.S.C. 154(b) by 139 days.

(21) Appl. No.: 16/750,562

(22) Filed: Jan. 23, 2020

(65) Prior Publication Data
US 2021/0232439 A1 Jul. 29, 2021

(51) Int. Cl.
*G06F 9/50* (2006.01)
*H04L 67/303* (2022.01)

(52) U.S. Cl.
CPC .......... *G06F 9/5083* (2013.01); *H04L 67/303* (2013.01)

(58) Field of Classification Search
CPC ...... G06F 9/5083; H04L 41/20; H04L 41/147
See application file for complete search history.

(56) References Cited

U.S. PATENT DOCUMENTS

| | | | |
|---|---|---|---|
| 9,612,815 B1* | 4/2017 | Jagtap | G06F 8/61 |
| 2003/0088696 A1* | 5/2003 | McCanne | H04L 29/06027 709/238 |
| 2015/0242133 A1* | 8/2015 | Smith | G06F 3/0632 711/114 |
| 2017/0111878 A1* | 4/2017 | Wang | H04W 60/00 |
| 2017/0332114 A1* | 11/2017 | Turgut | H04N 21/23424 |
| 2018/0013636 A1* | 1/2018 | Seetharamaiah | H04L 41/147 |
| 2021/0075853 A1* | 3/2021 | Banerjee | H04L 67/1008 |

* cited by examiner

*Primary Examiner* — Jefferey F Harold
*Assistant Examiner* — Franklin S Andramuno
(74) *Attorney, Agent, or Firm* — Workman Nydegger (57) ABSTRACT

One example method, which may be performed at an end device configured to communicate with an edge station, includes listening for a broadcast signal from the edge station, joining a broadcast channel, receiving edge station information, selecting an edge station, transmitting a manifest to the selected edge station, receiving route information from the selected edge station, accessing a container identified in the route information, and issuing a call to the selected edge station to execute an application workload on the container.

20 Claims, 6 Drawing Sheets

DYNAMIC WORKLOAD MIGRATION TO EDGE STATIONS

FIELD OF THE INVENTION

Embodiments of the present invention generally relate to edge computing. More particularly, at least some embodiments of the invention relate to systems, hardware, software, computer-readable media, and methods for enabling developers to implement, and deploy, applications that are able to migrate computing workloads from both cloud and end devices to edge stations.

BACKGROUND

Workloads executing in a cloud environment may involve, or at least implicate, communication of data between the cloud environment and, for example, a local area network located in an edge region of the cloud environment. As a result of workload execution in the cloud environment however, network latency between the cloud environment and the local area network may be significant and can adversely affect performance of the local area network and associated systems and devices.

BRIEF DESCRIPTION OF THE DRAWINGS

In order to describe the manner in which at least some of the advantages and features of the invention may be obtained, a more particular description of embodiments of the invention will be rendered by reference to specific embodiments thereof which are illustrated in the appended drawings. Understanding that these drawings depict only typical embodiments of the invention and are not therefore to be considered to be limiting of its scope, embodiments of the invention will be described and explained with additional specificity and detail through the use of the accompanying drawings.

DETAILED DESCRIPTION OF SOME EXAMPLE EMBODIMENTS

Embodiments of the present invention generally relate to data backup and restore processes. More particularly, at least some embodiments of the invention relate to systems, hardware, software, computer-readable media, and methods for running cloud and/or mobile device workloads in one or more local edge stations. This approach may, for example, reduce the network latency between a cloud computing environment and a local-area-network in which a mobile device, or other edge device, may be operating. As well, processing-intensive workloads, for example, may be off-loaded, or cast, from an edge device for execution in the edge stations. The casting of workloads may be employed in connection with any suitable casting protocol. By utilizing the compute and storage capabilities of local edge stations, end devices may be able to reduce their compute and storage burdens, and also reduce battery-life consumption, while also experiencing reduced latency. Thus, for example, as between an edge station and an end device, the application workload may be performed only at the edge station, and not at the end device.

In general, one or more example embodiments embrace a software-defined platform that may enable developers to abstract out the complication of building applications that utilize edge stations, as well as enable users to easily connect to the stations from those application in their end devices. At least some embodiments comprise three components, namely, a server component, a client component, and a manifest. The server component may installed on the edge station to which storage and/or processing workloads may be offloaded by one or more edge devices. The client component may be embedded inside any application whose storage, processing, and/or other, workloads may be off-loaded from the system or device, on which the application runs, to one or more edge stations. Finally, the manifest component may comprise a standard format that is employed by the application to help enable orchestration and execution of the workload offloaded by that application, with other offloaded workloads.

Embodiments of the invention, such as the examples disclosed herein, may be beneficial in a variety of respects. For example, and as will be apparent from the present disclosure, one or more embodiments of the invention may provide one or more advantageous and unexpected effects, in any combination, some examples of which are set forth below. It should be noted that such effects are neither intended, nor should be construed, to limit the scope of the claimed invention in any way. It should further be noted that nothing herein should be construed as constituting an essential or indispensable element of any invention or embodiment. Rather, various aspects of the disclosed embodiments may be combined in a variety of ways so as to define yet further embodiments. Such further embodiments are considered as being within the scope of this disclosure. As well, none of the embodiments embraced within the scope of this disclosure should be construed as resolving, or being limited to the resolution of, any particular problem(s). Nor should any such embodiments be construed to implement, or be limited to implementation of, any particular technical effect(s) or solution(s). Finally, it is not required that any embodiment implement any of the advantageous and unexpected effects disclosed herein.

In particular, one advantageous aspect of at least some embodiments of the invention is that such embodiments may contribute to a relative increase in battery life for edge devices since the workloads ordinarily imposed on the edge devices may be offloaded to other systems and devices, such as edge stations. In one embodiment, processing workloads may be executed relatively more quickly at an edge station than they would have been had the processing workloads instead been handled by the edge device associated with those processing workloads. In one embodiment, latency between an edge environment and a cloud environment may be reduced, since workloads that would otherwise be handled by the cloud may instead be handled at one or more edge stations. Particularly, the processing and/or storage workloads may be handled relatively closer to the locations, that is, edge devices, where the data associated with those workloads is being generated. Other example advantageous aspects that may be implemented by one or more embodiments of the invention are discussed below in the context of problems resolved or avoided by such embodiments.

B. Overview of Some Components and Example Operating Environments

In the present disclosure, various terms may be employed. Following are some explanations of some of these terms. 'Edge station' embraces, but is not limited to, any systems, machines, and software, that offer compute and/or storage services, where such compute services include processing services, and storage services include storage services include storing, copying, retrieving, restoring, and backing up, data of any kind. The storage services may be performed in connection with any type of memory and/or storage, examples of which are disclosed herein.

'End device' embraces, but is not limited to, any client of a service provided by an edge station. Thus, example end devices include, but are not limited to, smart phones, video and still cameras, computing devices such as laptops and tablets, and any Internet of Things (IoT) device including, but not limited to, any hardware, mechanical device, electrical/mechanical device, hardware/software combinations, and any other system or device, having a respective unique identifier and capable of communicating, such as by data transmission/reception, over a network or other computing system.

'Edge station service provider' embraces, but is not limited to, any organization or other entity that sets up and/or operates one or more edge stations as a service to one or more customers. Example edge station service providers include, but are not limited to, cloud service providers, restaurants, transportation companies, and governments such as state and local governments.

'Cloud computing environment,' or simply 'cloud,' embraces, but is not limited to any remote system or device, and combinations thereof, configured to host workloads, such as processing workloads and storage workloads, for example.

Figure 1:
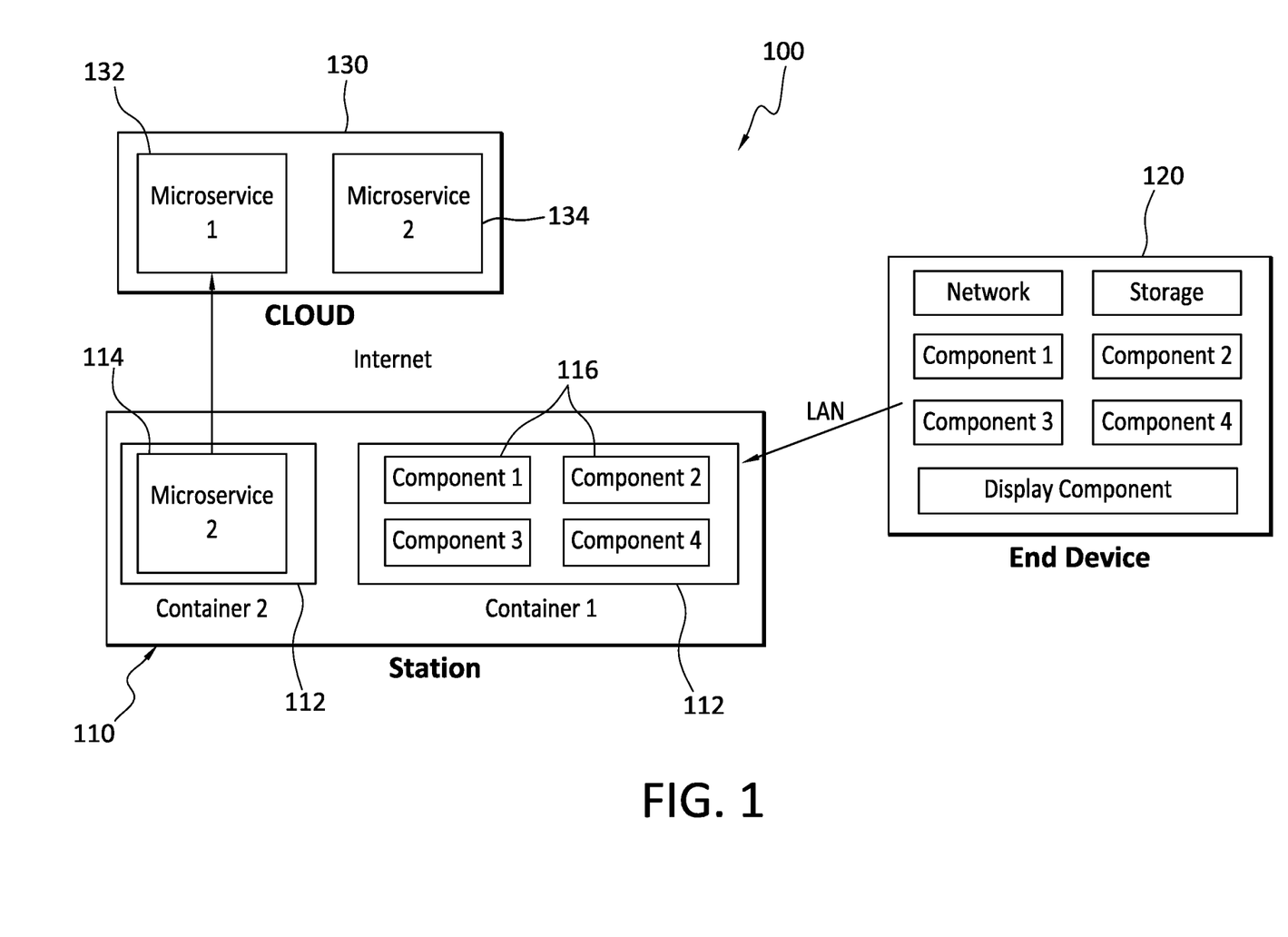
FIG. 1 discloses aspects of an example architecture.

With attention now to FIG. 1, a brief overview is provided concerning aspects of some example embodiments and operating environments, such as the operating environment 100. In some embodiments at least, one or more edge stations are implemented and used that may take the form of small mini-datacenters that may be installed across a geographical location. Edge stations may be distinguished from content delivery network, inasmuch as the end devices 120 of the edge stations may not only obtain static content, but may also connect to containers 112 running in these edge stations 110 to obtain additional functionality, such as computing and/or storage functionality for example. One or more of the edge stations 110 may communicate with a cloud computing environment 130, for example, that provides one or more end device 120 accessible microservices 132 and 134. The microservices 132 and 134 may additionally, or alternatively, be accessible by one or more microservices 114 and components 116 of an edge station 110. In the example of FIG. 1, the functionality of microservice 134 is moved to the edge station 110 and implemented as microservice 114. In this way, the microservice 114 is located relatively closer to the end device 120 and, accordingly, the latency between the microservice 114 and end device 120 may be relatively less than the latency between the microservice 134 and the end device 120. As also shown in FIG. 1, the end device 120 may communicate with the edge station 110 by way of a local area network (LAN), although other systems of communication may be employed between the edge station 110 and end device 120.

In more detail, these edge stations 110 may provide additional compute and storage power to the end-users, with reduced network latency as end devices 120 may directly connect to the edge stations 110 without having each network packet traveling over a long distance such as between the end device 120 and the cloud computing environment 130. With the compute, storage, and network benefit provided by edge stations 110, a new suite of technology is provided that enables creation of new user experiences.

The edge stations 110 may be relatively big or small in size, power, and processing/storage capabilities. Relatively large edge stations, for example, may be able to service and support an entire town or city, while relatively smaller edge stations may be installed inside within, or near, a local network, in private places such as a home or school, as well as in public places, such as a coffee shop or restaurant.

With the implementation of configurations such as the example disclosed in FIG. 1, some remote workloads, that previously may have executed in a cloud computing environment 130 may now be executed instead in a local edge station 110, reducing the network latency with local-area-network. As well, some of the local workloads that may ordinarily execute in end devices 120 may now be executed in the edge stations 110. By utilizing the compute and storage capabilities of the local edge station 110, end devices 120 may, for example, reduce their own compute and storage burdens, and also reduce battery-life-consumption.

At least some embodiments of the invention are software-defined and may be installed on any infrastructure, and utilize existing container orchestration stacks, examples of which include Docker, KNative, Kubernetes, Cloud Foundry, and Linux. None of these orchestration stacks are required to be employed however.

With respect to communications between, for example, an end device and an edge station, such communications may include, but are not limited to, command/control signals, and/or data such as data generated by and/or at the direction of one or more applications hosted on the end device.

As used herein, the term 'data' is intended to be broad in scope. Thus, that term embraces, by way of example and not limitation, data segments such as may be produced by data stream segmentation processes, data chunks, data blocks, atomic data, emails, objects of any type, files of any type including media files, word processing files, spreadsheet files, and database files, as well as contacts, directories, sub-directories, volumes, and any group of one or more of the foregoing.

Example embodiments of the invention are applicable to any system capable of storing and handling various types of objects, in analog, digital, or other form. Although terms such as document, file, segment, block, or object may be used by way of example, the principles of the disclosure are not limited to any particular form of representing and storing data or other information. Rather, such principles are equally applicable to any object capable of representing information.

C. Problems that May be Addressed/Avoided by Some Embodiments

Example embodiments may resolve, or avoid, a variety of different problems and shortcomings. Examples of such problems and shortcomings are considered in the following discussion.

One such problem concerns the fact that end devices, such as laptops, tablets, mobile phones, smart/IoT devices mobile phones for example, have limited computation, storage, and battery-life. This may be due to the fact that such devices were not designed or intended for the processing and storage workloads that may be imposed on them as result of advances in technology, and the increasing sophistication of installed apps. As a result of such limited capabilities, such end devices may become overheated when significant processing and/or storage loads are imposed. Some computational workloads executed on end devices may be better suited to be executed in edge stations, such as those disclosed herein, that are connected to a stable and reliable electrical power source, and which may provide more robust processing and storage power. Given typical client-server architectures, there is no practical way to transfer computation and/or storage from an end device to another entity for execution or other handling.

As noted earlier, latency between a client such as an end device, and a cloud hosted process, may be a problem due to the relative distance between those elements, such as latency between the end device 120 and the cloud computing environment 130 in FIG. 1. For example, in client-server types of applications, the quality of the user experience may depend on the network speed between a client, running on the end device, and a remote server. The network speed depends on the internet speed, which is typically outside the control of the end-user and application providers.

As another example, where edge stations do exist, such as in a LAN for example, their functionality and capabilities are relatively primitive. For example, such edge stations are incapable of accepting workloads from an end device. Moreover, there is no mechanism in any event that would enable an end device to discover the edge station without the end device somehow obtaining an in-depth understanding and awareness of how the edge station is set up. This limitation of discovery prevents end devices from utilizing the edge stations easily.

On a related note, no orchestration engines exist that would enable developers to utilize these edge stations. Typical container orchestration technology stacks lack the specific functionality and abstraction that might enable developers to mobilize their application workloads into an edge station. Absent a standard for defining and orchestrating the software components that could be executed on the edge stations, developers may have a difficult time creating applications that can offload software components and their associated functions to the edge stations.

A further difficulty concerns deployment and orchestration of software components executing on edge stations. Even if an application were developed that was able to utilize edge stations, there still would be a need to for automated deployment and orchestration of those software components when a user wished to utilize the resource from his edge station, since a manual approach would be slow and impractical.

Another problem addressed by embodiments of the invention is that of permission for 'private' edge stations, such as one located on-premises at a home or school for example. Given current cloud infrastructure and technologies, and the primitive nature of edge stations, developers would have to obtain deployment permission on such private edge stations in order to attempt to orchestrate workloads on the private edge stations. As things currently stand however, it is not possible for an outside party to obtain permission to use private edge stations, nor are there mechanisms for enabling such use in any case.

Finally, a related problem is that end devices have no way to be able to identify, select, and employ, an edge station with appropriate, and adequate, processing and/or storage capabilities. Thus, offloading of storage and/or processing workloads from an end device to an edge station is effectively prevented.

D. Aspects of Some Example Embodiments

In general, example embodiments may enable software developers to utilize a local station to run software components that would normally run on a mobile device and/or cloud. When the mobile app is not cast to an edge station, the app functions normally in a client-server model. Embodiments may be employed in various circumstances such as, for example, where the end-device moves occasionally, but remain stationary for at least some period of time. By decomposing a mobile application and running computation intensive code on an edge station, an embodiment of the invention may take a processing and/or storage burden off of the end device. As well, by bringing a piece of a cloud component to execute from inside a LAN, rather than in the cloud environment, connection with the end device may be faster and network traffic back to a cloud datacenter should be reduced. As well, a standard casting protocol may be employed so that a user is able to select and utilize edge stations around her, such as edge stations located in a home, coffee shop, restaurants, bus, train, or airplane, for example.

Briefly, in terms of its operation, an embodiment of the invention, which may be referred to herein with the trade name ConKage, broadcasts (or multicasts) signal on local network. When an end device, such as a phone or tablet for example, connects to a local network, the signal is picked up by the ConKage SDK installed on the device.

When a program is written according to ConKage pattern, it can utilize the ConKage SDK to cast containers to a ConKage Host. ConKage Host obtains execution parameters, such as a container image and run time variables for example, from the device, executes the containers on the underlying container orchestration system, then returns route(s) back to the client. The client, instead of executing the code locally on the end device, performs remote calls on the edge station instead. Further details concerning some example embodiments are disclosed in Appendix A hereto, which forms a part of this disclosure and is incorporated herein in its entirety by this reference.

Embodiments of the invention may be implemented and employed in a variety of contexts, and the scope of the invention is not limited to any particular context, nor to the examples disclosed herein. At least some embodiments may be employed in connection with one or more native applications of an end device, such as a mobile phone for example. Yet other example embodiments may be employed in connection with web applications, such as by way of a browser plug-in for example. The web application may include one or more components installed on an end device.

Figure 2:
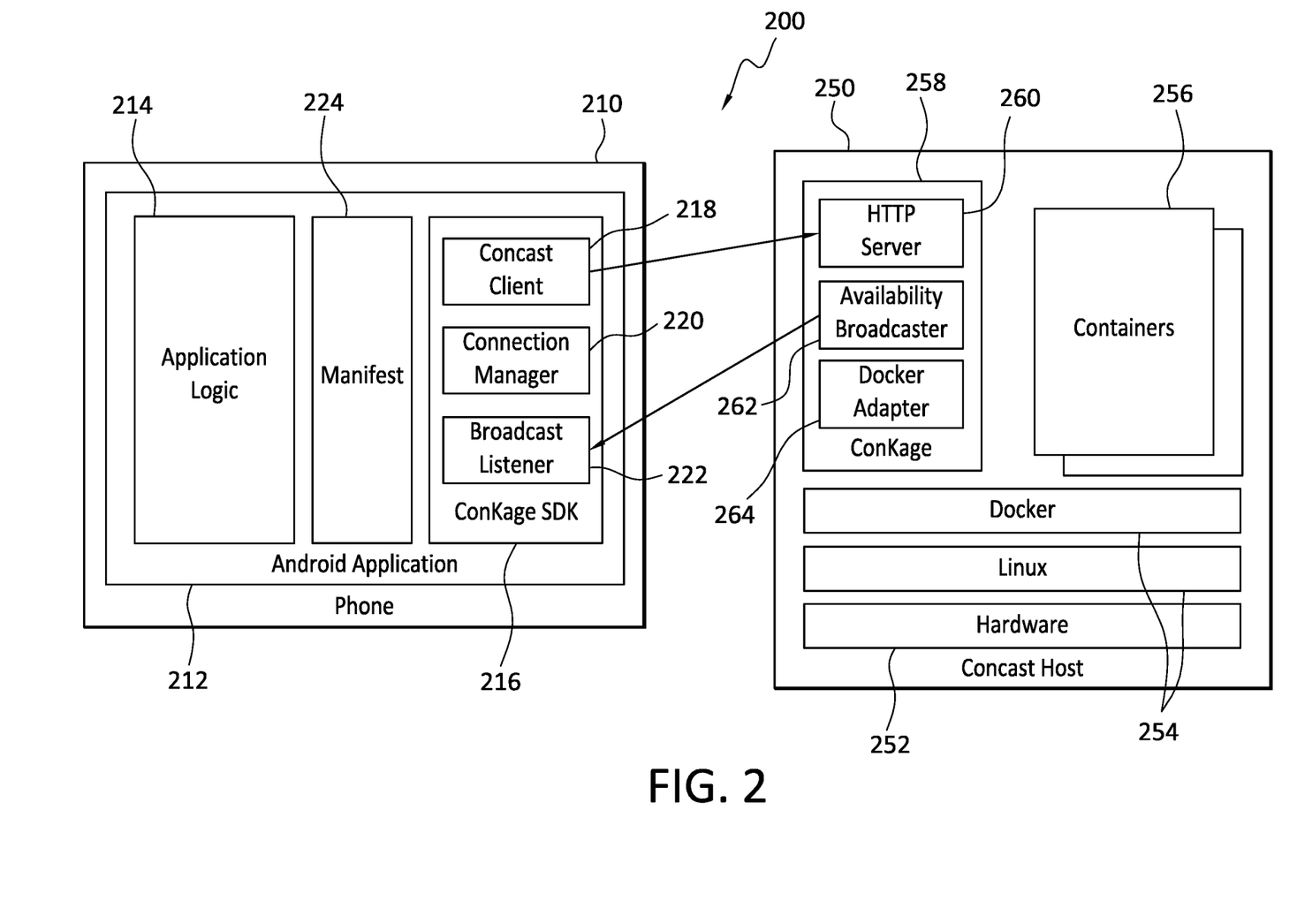
FIG. 2 discloses aspects of example configurations of an edge station and an end device.

With particular attention next to FIG. 2, one example implementation of an embodiment of the invention is generally denoted at 200. As shown, implementation of embodiments of the invention may involve one or more end devices 210 that are configured for communication with an edge station 250. The end device 210 and edge station 250 may communicate with each other in any suitable manner, examples of which include, but are not limited to, wireless and/or hardwire networks, near field radio communication, and Bluetooth or other wireless technology.

In the example of FIG. 2, the end device 210 comprises a mobile phone, but any other end device(s) may additionally, or alternatively, be employed. The end device 210 may include one or more applications 212 which may comprise, for example, applications downloaded from an app store, and/or may comprise one or more native applications installed on the end device 210 at the time of manufacture.

The application 212 includes application logic 214 that is executable to carry out the functions of the application 212. As well, the application 212 may include a software development kit (SDK) 216 which may comprise, for example, a set of application program interfaces (APIs) that enable performance of any actions needed to create, for example, a client component 218, such as a concast client. In some embodiments, the SDK 216 may be omitted, and the client component 218 simply embedded in the application 212. As further indicated in FIG. 2, the application 212 may further include a connection manager 220, and a broadcast listener 222, both of which may, but are not required to, comprise elements of the SDK 216. In some embodiments, any of the components SDK 216, client component 218, connection manager 220, and broadcast listener 222 may be included by a developer in the application 212 as part of the of the initial application 212 development process. In other embodiments, any of the components SDK 216, client component 218, connection manager 220, and broadcast listener 222 may be retrofitted, or plugged, into an existing application that was initially developed without including those components. Finally, the end device 210 may include a manifest 224, which may comprise an element of the application 212. The manifest 224 may, or may not, be included as an element of the SDK 216.

The edge station 250 may include various hardware 252, such as processors, memory, hardware accelerators such as graphics processing units (GPU), and storage, used to carry out the various functions of the edge station 250, including those functions offloaded to the edge station 250 by one or more end devices 210. A container orchestration stack 254, such as Linux or Docker for example, may be provided in the edge station 250. Correspondingly, various containers 256 may also be included in the edge station 250. In general, a container such as the containers 256, may be executable to perform various functions. The edge station 250 further comprises a host 258 that comprises an HTTP server 260 which may also be referred to herein as a 'server component,' availability broadcaster module 262, and docker adapter 264. Following is a discussion of an example embodiment of the client component, the manifest, and the server component.

E. Aspects of an Example Client Component

As noted in the discussion of FIG. 2, example embodiments may comprise a client component, such as the client component 218 for example. In general, a respective instance of the client component may be embedded within one or more of the various applications of an end device. Based on the implementation of the application, developers may have the freedom to implement their own client component, as disclosed herein. Alternatively, a developer may utilize a client SDK, such as the SDK 216 for example.

In general, the client component may have at least two responsibilities. The first of these responsibilities may be to listen for broadcast from the server component, specifically, broadcast information from an availability broadcaster, such as the availability broadcaster 262 of FIG. 2. The second responsibility of the client component may be to communicate information between the application and the server component.

The server component broadcasts the availability and information of edge stations via different mechanism, such as one-to-all broadcast, multi-cast, or other communication mechanism. The communication mechanism may be chosen by the edge station administrator based, for example, on settings of the local-area-network. The client component may be configured to handle multiple different communication mechanisms in order to effectively receive broadcast signals from various different types of edge stations and networks.

After the end device receives a broadcast signal from the edge station, the edge station information in that signal may be kept alive at the end device for a configurable amount of time, such as about 5 seconds for example. If another signal from the same edge station is not received by the end device within the kept-alive time period, the client may assume that the broadcasting edge station is no longer available and may remove the edge station from memory at the end device.

Depending upon the implementation of the application, such as the application 212 for example, in the end device, the information of available edge stations within the local-area-network may be made available to the user. As well, the availability of an edge station to an end device may depend on whether or not the edge station is in communication range with the end device. The user may be presented, such as by way of a user interface (UI) in the end device, with an option to "attach" workloads of the application to a particular edge station, which may be selected by the user. For example, the user may be presented with a list of edge stations to which the end device workload may be attached.

The application may be implemented in a way such that when the user does not choose to "attach," the application would execute in a "normal" manner on the end device, and the edge station will not execute the workload. On the other hand, if the user chooses to "attach" end device workloads associated with the application, then the application may invoke the client component with the manifest, discussed below. The client component would then send an "attach" request to the server component, along with the manifest for the server component to initialize the end device workloads.

New communication routes may then be received from the server component by the client component of the end device. The client component may then responsible for keeping track of these communication routes and communicate continuously, or on some other basis, with the server to maintain the lifecycle of the end device workloads running on the edge station(s). For example, the application may query the client component for the communication routes when needed, and utilize the new communication routes to access workloads running on edge stations. When workload no longer needs to be executed on an edge station, the client may also communicate with the server component of the edge station by sending a "detach" request along with the manifest. The server component may then be responsible for removing the workloads described in the manifest that was previously received by the server component from the client component.

F. Aspects of an Example Manifest

In general, the manifest from the application, such as the manifest 224 for example, may be responsible for describing the end device workloads that need to be executed on the edge station. The manifest may be transmitted from the client component to the server component when a user of the end device decides to "attach" one or more end device workloads to the edge station.

In more detail, an example manifest may contain information about one or more end device application workloads. Each workload entry in the manifest may contain information such as, but not limited to, the following: container image location; runtime information, including environment variables, and identification of a preferred hardware environment; and routing information. The workload entry may additionally, or alternatively, contain any other information that may help to enable attachment, execution, and/or detachment, of the workload at the edge station.

The container image location may be a uniform resource locator (URL) that the edge station can access through a network, such as a LAN for example. The preferred hardware environment may provide an abstraction of preferred environment to execute one or more workload(s). For example, the workload can be "computed-optimized" and run in an environment with higher CPU capability. The preferred hardware environment information may also specify hardware accelerator requirements, such as a GPU for example. The routing information describes how the client at the end device to the edge station can communicate with the workload running within the edge station. For example, the port that the workload is listening to should be included in the routing information section. Finally, additional information may be included in the manifest if the implementation of the server component provides additional capabilities, so that the application may use these additional capabilities when the application workloads are executed at the edge station.

F. Aspects of an Example Server Component

In general, the server component may be installed on the edge station. The server component may serve three main purposes: broadcast the availability and information of the edge station; listen for requests from the client component of one or more end devices; and, orchestrate and maintain a lifecycle of the workloads that have been attached to the edge station. In some embodiments, the server component may be installed on top of any modernized container execution technology stack, examples of which include the Docker and Linux implementations indicated in FIG. 2. Internally, the server component may comprise three sub-components, each corresponding to a respective responsibility of the server component, namely, an availability broadcaster, an HTTP server, and an orchestrater, one example of which is a Docker adapter such as the Docker adapter 264 shown in FIG. 2.

In more detail, the availability broadcaster, which may also be referred to herein simply as a 'broadcaster,' broadcasts packets indicating the availability of, and information such as processing and storage capabilities and hardware of, the edge station across the LAN, where those packets may be received by one or more end devices that are able to communicate over the LAN. The availability broadcaster is configurable based on local network settings, for example. The type, and amount, of information broadcasted may be configurable. By default, the broadcast information may at least include edge station hardware information, including CPU, RAM and hardware accelerator, such as GPU. The information to be broadcast may be configured manually, or detected automatically by the availability broadcaster from hardware settings of the edge station.

In some embodiments, an edge station may charge some amount to a user who wishes to attach an end device workload to the edge station for execution. If the edge station is charging a price for utilization of its processing and/or storage capabilities, the pricing information may also be included in the broadcast information. In this example, the server component may also include a billing component that is responsible for billing and payment based on utilization of edge station resources by the application workload(s).

The HTTP server element of the server component may be responsible for communication with clients. The HTTP server may comprise two APIs: an 'Attach' API that may be called when client needs to add new workloads to the edge station; and a 'Detach' API that may be called when a client needs to remove workloads from the edge station.

Finally, the orchestrater may parse the manifest received from the client component of the end device to understand the workloads that are to be attached to the edge station. The orchestrater may then invoke adapters to initialize and orchestrate those workloads with the underlying technology stack. Depending on the underlying technology stack, different adapters may be implemented and utilized. To illustrate, for a single-host edge station with Docker installed, a Docker adapter may be implemented. Likewise, for an edge station with multiple host Kubernetes implementation, a Kubernetes adapter may be implemented. The orchestrater may continue to monitor the status of the workloads and communicate to the client component of the end device up-to-date lifecycle information concerning the workloads being handled by the edge station.

F. Aspects of an Example Web Application Implementation

Figure 3:
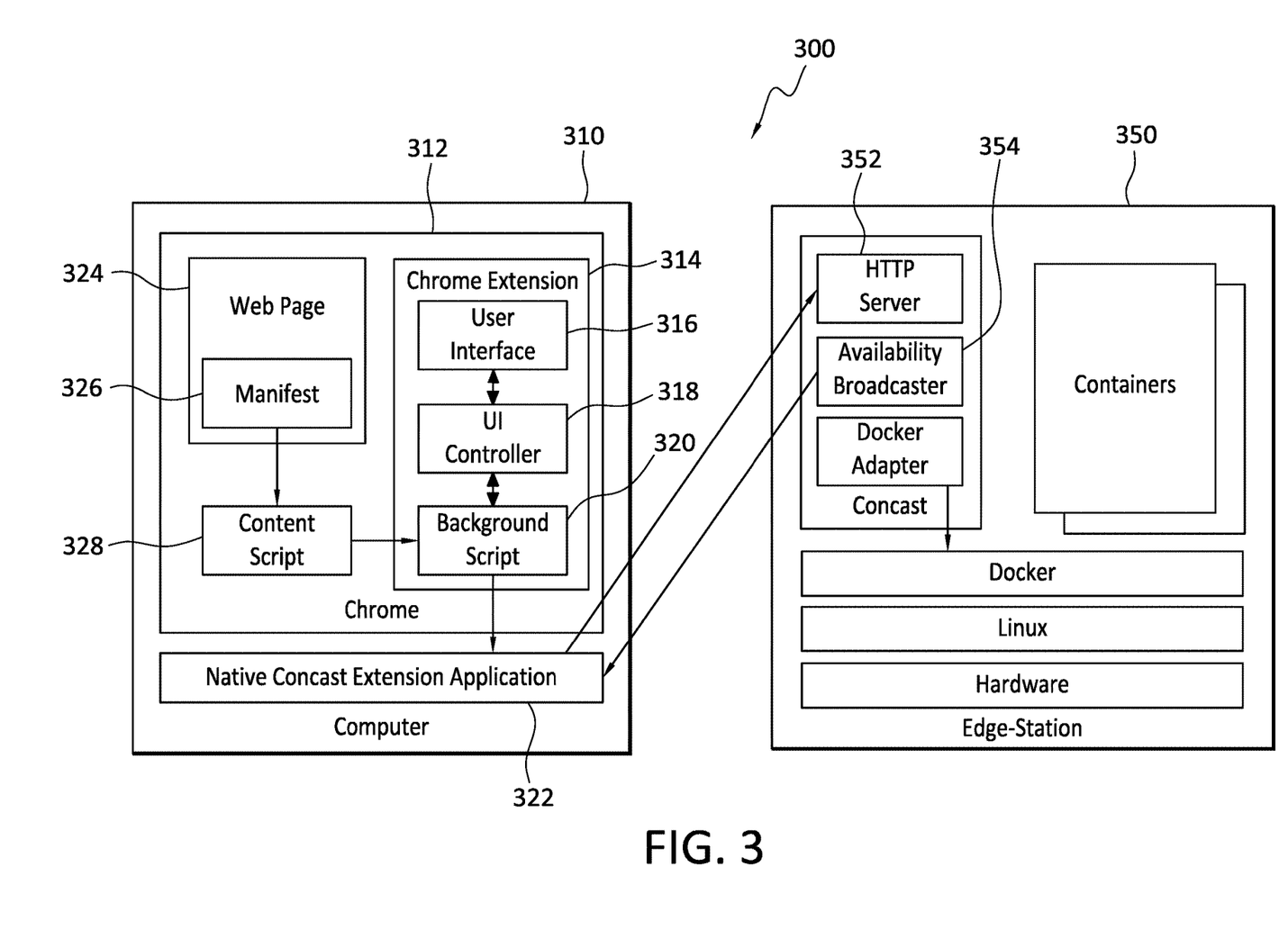
FIG. 3 discloses aspects of alternative example configurations of an edge station and an end device.

Turning next to FIG. 3, details are provided concerning an example embodiment, denoted generally at 300, that may be implemented in connection with a web application. Except as may be noted below, the implementation in FIG. 3 may be similar, or identical, to the implementation disclosed in FIG. 2. Thus, only selected differences between the two implementations are addressed in the following discussion.

As indicated in FIG. 3, the example implementation 300 may involve one or more end devices, such as end device 310, that communicate(s) with one or more edge stations, such as edge station 350. The end device 310 may include a browser 312, such as the Google Chrome browser for example, although other browsers may alternatively be used. The browser 312 may also include a browser plugin 314 that is able to present a UI 316 which, in turn, may be controlled by a UI controller 318 of the browser plugin 314. Finally, the browser plugin 314 may run a background script 320 which, among other things, may communicate with the UI controller 318 to provide input to, and receive input from, the UI controller 318.

The browser plugin 314 operates to execute a native application 322 that is an extension of the browser plugin 314. The native application 322 communicates with an HTTP server 352, and availability broadcaster 354, of the edge station 350. In more detail, the native application 322 includes an instance of a client component, one example of which is discussed above in connection with FIG. 2, that communicates with the HTTP server 352 and the availability broadcaster 354.

With continued reference to FIG. 3, the browser 312 may store and/or display one or more web pages 324 of a website, and an instance of a manifest 326 may be embedded in the website. The manifest 326 may be provided to the client component of the native application 322 by way of a content script 328 and the background script 320. More particularly, the background script 320 may listen for invocation from the content script 328 that a manifest 326 is indeed presented in the web application and act accordingly. The content script 328 interprets the manifest 326 that is embedded inside the web application. This configuration of the content script 328, manifest 326, and background script 320 may be implemented to accommodate browsers, such as Chrome for example, that may require the scope of different scripts to be divided. Thus, for example, the content script 328 may have access to the content of web applications. In some embodiments, only one background script 320 would need to be executed in order to serve multiple web applications opened, that is, multiple browser tabs.

With the foregoing discussion of FIG. 3 in view, further details are provided concerning some example embodiments that involve web applications, such as the example implementation 300. Particularly, and as noted earlier, not only a native application running on the end device 310 may employ one or more embodiments of the invention, but embodiments of the invention may also be implemented in connection with web applications. To this end, such embodiments may comprise an additional component, namely, the browser plugin 314 to the native application 322. In general, the native application 322 may open a User Datagram Protocol (UDP) port to listen to a broadcast from the availability broadcaster 354. As well, the web application may need to embed the manifest 326 in the application itself. When both the manifest 326 and the broadcast are available, the browser plugin 314 may be enabled. The user may then select a host to which the containers specified in the web site will be cast by the end device 310.

In more detail, web applications are typically hosted on remote datacenters, with content downloaded and viewed by browser running on end devices 310. Users may also interact with web applications through the browser 314. Since developers of web applications cannot program their web sites to access the LAN, a browser plugin 314 may be employed. In general, the server component 352 may be structured, and operate, the same in the web application context as the server component 260, and the server components 352/260 may be able to serve both native applications and web applications. The browser plugin 314 may execute a native application 322, which is an extension of the browser plugin 314. This native application 322 may have the client component embedded and communicates with the browser plugin 314 through communication mechanisms, such as the background script 320 for example, which may be defined by the browser 312. The client component embedded in the native application may listen for a broadcast and determine if an edge station 350 is available.

Figure 4:
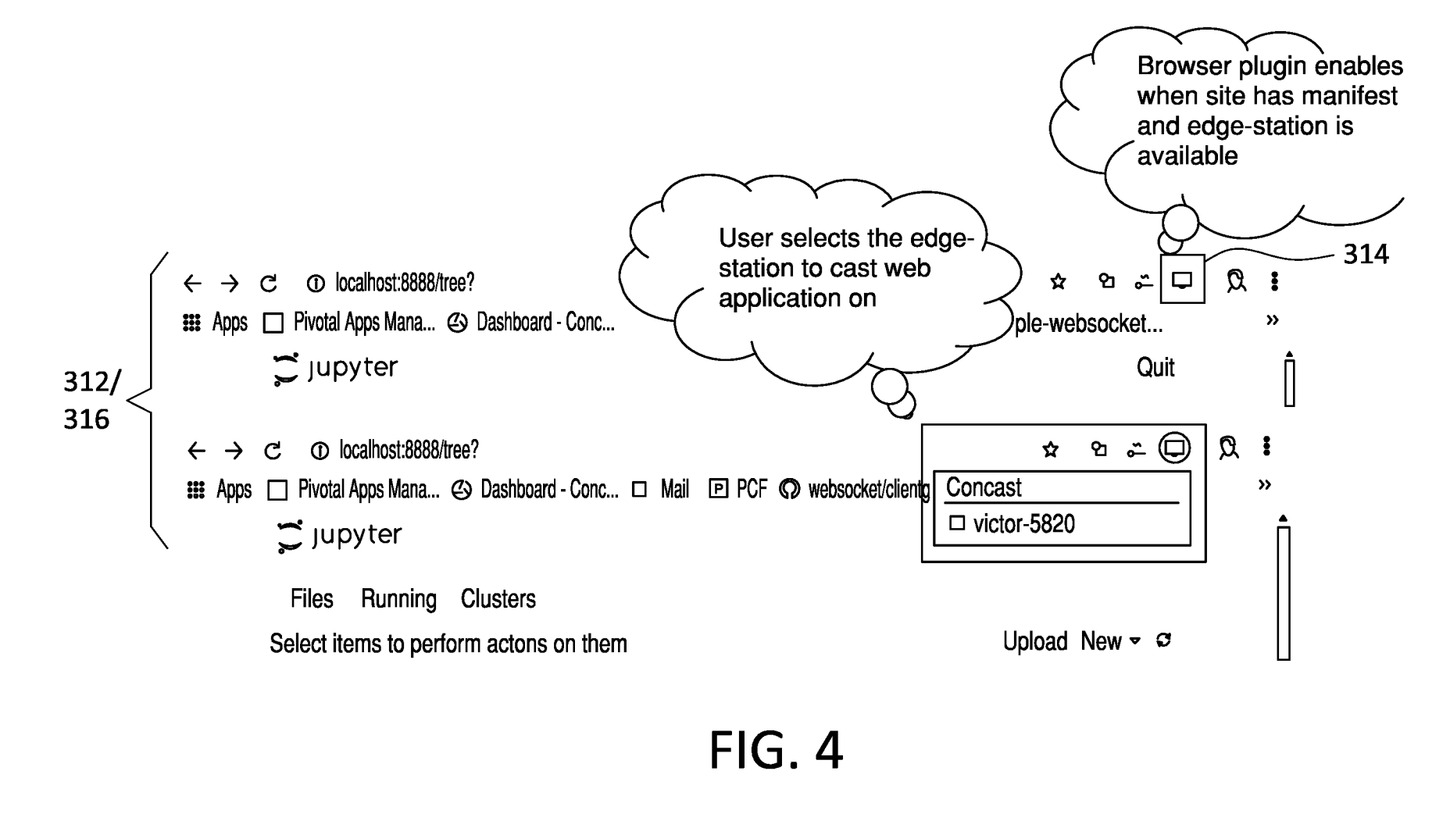
FIG. 4 discloses aspects of an example browser display.

Developers of the web application may embed the manifest 326 into the web site that includes the web page 324, and the manifest 326 may remain hidden from the end user. The browser plugin 314 may obtain this hidden manifest 326 from the web site after the manifest 326 is downloaded locally in the browser 312. In some embodiments, and with reference to FIG. 4, the browser plugin 314 may only be available for the user when both of the following conditions are met: (i) the manifest 326 is available on the active web site displayed in UI 316 of the browser 312; and (ii) an edge station 350 is available in the LAN.

The workflow of web applications may be largely the same as for native applications. The manifest 326 in the web application scenario however, may have an additional field in the routing information section. This additional field may indicate, for example, whether a workload would require an additional tab to be opened on the browser 312. When the manifest 326 has this field defined, the browser plugin 314 may open up a new tab to open the route returned by the server component 352.

G. Aspects of an Example Workflow

With the discussion of FIGS. 1-4 in view, and particularly FIGS. 1 and 2, following is an example workflow that may occur at runtime in some embodiments of the invention. The example workflow discloses the structure and operation of an embodiment of the invention in the context of a native application, rather than a web application. For web applications to utilize this invention, an additional component, namely, a browser plugin such as browser plugin 314, may be involved in the workflow as disclosed above in the discussion of FIGS. 3 and 4.

Example Workflow:
1. After the server component is installed and configured in an edge station, the server component may begin to listen to HTTP requests from client such as an end device to "attach" and "detach."
2. After the HTTP server is ready to serve, the server component may start to broadcast the availability, and details such as hardware and processing/storage capabilities, of the edge station on the configured network channel. Multiple different server components may broadcast at the same time, such that one or more end devices in the broadcast range of one or more of the server components may acquire multiple different broadcast signals at a given point in time.
   a. The broadcast functions of the broadcast mechanism, such as an availability broadcaster, may be configurable, including options such as, but not limited to, one-to-all broadcast, and multi-cast.
   b. This broadcast may be based on a configurable time-frequency, so that a new device joining a network may be able to acquire a broadcast signal within a reasonable time-period.
   c. Information concerning the hardware capabilities of a broadcasting edge station, such as CPU, RAM, GPU, for example, may also be configured on the HTTP server to be broadcasted, so that the client, such as an end device, can present such information to the user, such as by way of a UI of the end device.
   d. The address of the HTTP server (from step 1) may also be included in the broadcast, so that any client component of an end device listening for broadcast would know how to communicate with the broadcasting server component of the HTTP server.
3. When an application with the embedded client component executes on an end device, the end device may automatically join the broadcast channel on the local network, utilizing existing network setting of the end-device. If the implementation utilizes a one-to-all type broadcast, the client may listen to a specific pre-defined port or, in a multi-cast scenario, the client may join the specific multi-cast channel.
4. When the client component of the application at the end device receives the broadcast, information about the broadcasting edge station will be presented, such as by way of an end device UI, to the user for review and possible selection.
5. With this information, the user may then make an informed decision as whether to utilize any of the available edge stations within the local-area-network. If the user does not select any of the available edge stations, the application on the end device may simply run its processes using end device resources such as processors and memory, rather than offloading those prices to one or more of the edge stations.
6. After the user selects an edge station, the client component of the application at the end device may send over the manifest from the end device to the HTTP server of the server component, performing "attach." This manifest may be defined by the application provider, following a standard format, one or more examples of which are disclosed herein.
7. After the server component receives the manifest, the server may then orchestrate the underlying technology stack to download the container images and execute the containers described in the manifest.
8. After the containers are executed and ready to serve, the server component may then return routes of the containers to the client component of the application at the end device.

9. The application may then utilize the routes to access the containers running on the edge station.
   a. For workloads that may otherwise execute locally on the end device, the application may create a remote call to execute on a container running on the edge station. The remote call may be created through, for example, a socket, HTTP call, pub/sub, message, remote procedure call (RPC), or any other remote execution mechanism.
   b. For workloads that may otherwise execute remotely at a cloud computing environment, the application at the end device would replace the original remote URL of the cloud computing environment with the route provided to the client component by the broadcasting edge station.
10. When the edge station is no longer needed, for example if the user of the end device needs to go a different location that would involve movement of the end device out of communication range of the edge station, or if the user is done with the application and the application processes that were offloaded to the edge station have finished, the application may send a "detach" request, along with the manifest, to the HTTP server of the server component.
11. After receiving the "detach" request, the server component may then orchestrate the underlying technology stack to stop the execution of any container described in the manifest received from the client component of the end device.

H. Example Methods

Figure 5:
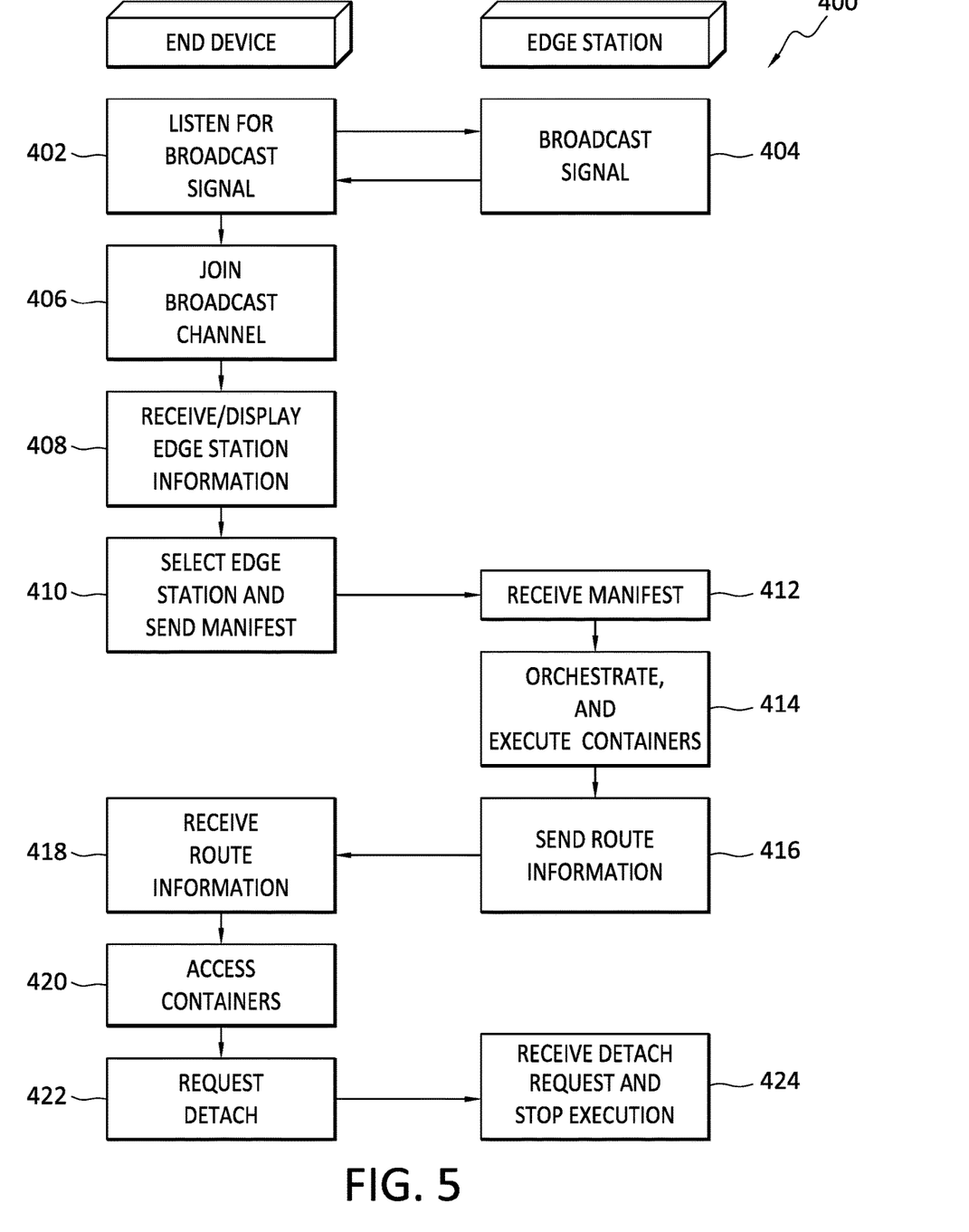
FIG. 5 discloses aspects of an example method.

With reference now to FIG. 5, details are provided concerning example methods for offloading application processes, which may be associated with a native application and/or a web application, from an end device to an edge station, where one example of such a method is denoted generally at 400.

The method 400 may begin when an end device listens 402 for a broadcast signal from one or more edge stations. At the same time, the edge station may broadcast 404 a signal indicating the availability of the edge station, and the capabilities of the edge station. The edge station, upon joining a network such as a LAN to which the edge station is also connected, may then join 406 the channel on which the edge station is broadcasting. As a result of having joined 406 the broadcast channel, the edge station may then receive and display 408 information concerning the availability and capabilities of one or more edge stations. A user of the end device may then select one or more edge stations to which a workload associated with the end device may be offloaded, and the end device may then send a manifest to the edge station. The selection of an edge station and transmission of the manifest are denoted generally at 410.

The manifest may be received 412 at the edge station, and the edge station may then orchestrate the operations of a technology stack of the edge station to download container images and execute containers 414 that were identified in the manifest. At this point, the containers may be in a state where they are responsive to an RPC, or other communication such as a URL replacement, from the end device requesting performance, at the edge station, of one or more processes associated with one or more applications associated with the end device. The edge station may then transmit route information 416 which may be received 418 by the end device.

The route information may then be used by the end device to access 420 one or more of the containers running at the edge station. For example, for an application workload that might otherwise be performed at the end device, the application may create a remote call to execute one or more application workloads, such as storage and/or processing operations, on one of the containers running on the edge station. As another example, for an application workload that might otherwise be performed remotely at a cloud site, the application at the end device may replace the URL of that remote site with the route provided 416 by the edge station to the end device.

When the application workloads have been completed at the edge station and/or at any other time, the application at the end device may send a request for detachment 422 to the edge station. After receipt 424 of the detachment request, the edge station may then stop execution of any application workload processes still running.

I. Further Advantageous Aspects of Some Embodiments

Following is a discussion of various advantageous aspects of some embodiments of the invention. For example, embodiments of the invention may provide a mechanism for developers to implement applications that can migrate workloads from both cloud and end devices to edge stations. With cloud workloads, for example, running on the edge-stations, network latency between the workloads and end device may be reduced, and thereby improve the user experience. With end device workloads running on the edge stations, the end device application may now utilize additional compute and storage resource of the edge station, reducing the resource consumption on the end device.

As another example, embodiments of the invention may provide a mechanism, and a standard, for an edge station to broadcast its availability and information across a LAN, and for a client component of an end device application to receive the broadcast and react. A user may then decide whether to migrate workloads from the end device to the edge station(s). If the user decides to migrate, the user may also select the edge station that best fit the needs of the application.

Further, embodiments of the invention may provide an abstraction for developers to define workloads that can execute on edge stations. As well, embodiments of the invention may also define an architectural design pattern that these applications can implement and build on.

As a further example, embodiments of the invention may provide for the automation and orchestration of workloads to migrate to one or more edge stations from one or more end devices and/or cloud sites. Based on the adapter design pattern, an adapter, such as a Docker adapter for example, can support various container technology stacks, allowing workloads to freely migrate from one environment to another without need of transformation. The adapter may also monitor and maintain the workloads throughout their lifecycles.

As well, example embodiments may enable software providers to eliminate the need for controlling workloads from a centralized control panel provided by cloud service providers, and may instead control the execution of workloads using only container images and manifests. Further, embodiments of the invention enable edge administrators, during setup, and/or an end user, by selecting an edge station, to provide permission to deploy into a "private" edge station. This offloading of permission enables software providers to get into private settings that would not be possible if solely depending on cloud service providers.

Finally, embodiments of the invention may provide a way for edge stations to broadcast their availabilities and capabilities, so that the end user can make an informed decision based on information presented by the edge stations. Such decisions may regard, for example, which edge station(s) should be used to execute workloads, whether an edge station should be used at all, and the hardware capabilities of an edge station such as, for example, how fast are the CPU cores of the edge station, and how many GPUs are available, if any.

J. Some Example Use Cases

The following examples illustrate ways in which some embodiments of the invention may behave. For example, embodiments of the invention may be implemented in, comprise, or consist of, a turn-key appliance for global enterprises. Global enterprises may have offices of various sized in many countries. Limited by budget and ROI, it is typically difficult for enterprises to set up private datacenters in each geographical location. Further, manually setting up the entire suite of enterprise applications on cloud service providers for all geographical locations would typically require too much effort and the hosting cost would also not be able to justify the investment for locations with small population. While employees working at headquarters may have good network latency when connecting to the enterprise software, offices in remote locations tend to suffer with high network latency and poor user experience when connecting to enterprise software installed at datacenters across continents.

Thus, some embodiments of the invention may be implemented as a turn-key appliance, combining software, compute, storage and networking capabilities into one appliance. The office manager may plug in this appliance and configure it with the network of the office. The enterprise applications may continue to be hosted in one or a few centralized locations. Employees working at remote offices may select the local edge station to migrate workloads of the applications to a LAN when using a specific application. Utilizing this appliance, the employees at the remote office would no longer need to suffer from poor network latency, as workloads may now be executed locally, or at least relatively closer to the offices where the data to be processed is being generated. On the other hand, the enterprise also does not need to host the entire suite of enterprise software for each low-population office. Since only attached applications will be utilizing the edge stations, the edge station may not need computation and storage capabilities to support the entire suite of enterprise applications, but only what is necessary to support the applications being actively used by the population of the remote office.

In another example, embodiments of the invention may be implemented in, comprise, or consist of, an edge station for smart home devices. Smart home devices are gaining popularity. These home devices include game consoles, security systems with camera and image recognition, water and air sensors and controls, and many other functionalities. While these home devices are offered by different vendors, some of the devices have similar hardware requirement, including compute, storage, and network. Some devices, like security systems, even require hardware accelerators, such as GPU, for real-time inference. Although it is possible for these devices to each ship with their own hardware to satisfy their own end-to-end use cases, designing and manufacturing device-specific hardware stacks may require unnecessary cost. Software design and development on such specialized hardware also require unnecessary challenges and consideration. Finally, the material and parts required by the hardware implementation of each device may not only increase the physical size of these devices, but would also push up the price of the end-products, ultimately decreasing the competitive edge for the smart home device providers.

Thus, some embodiments of the invention may be implemented as a turn-key appliance for private homes. Devices compatible with the appliance may be able to share hardware resources offered by the edge station with other use cases. Each homeowner may purchase this appliance and configure with the local home network, which may include various IoT and other smart home devices, of the homeowner. During the installation of each smart home device, the connection of the device to the edge station may be selected. Workloads may then be downloaded from the device to run on the edge-station to serve these smart devices. In this way, smart home devices would not be required to provide the entire hardware stack, but instead utilize the compute, storage, and network capabilities offered by the edge stations. The smart home devices may then only need to communicate with their workload running on the edge stations through a LAN. This approach enabled by embodiments of the invention may greatly lower the complexity of hardware requirement of the smart home devices, resulting in lower hardware design and hardware manufacturing cost.

As well, the software shipped with the smart home devices may be designed and developed against a well-defined standard software stack such as Linux, for example. This reduction of software development cost, hardware design cost, and hardware manufacturing cost may ultimately lead to lower price for the end products, greatly improving the competitive edge for the device providers. Further, the homeowners can also purchase these smart home devices at a lower price, leading to a "smarter" and more automated lifestyle for families. Finally, as some embodiments of the invention may be software-defined and do not require any specific hardware setup, such embodiments may also be shipped to end-users as a software-only edition, rather than embodied in a physical appliance. Such embodiments may be installed, for example, on any existing Dell machines with sufficient hardware capabilities, such as the Dell 5820 tower for example. The rest of the functionality would remain the same, but the software edition of some embodiments of the invention would then turn any computer with sufficient capabilities into a smart home edge-station.

K. Further Example Embodiments

Following are some further example embodiments of the invention. These are presented only by way of example and are not intended to limit the scope of the invention in any way.

Embodiment 1. A non-transitory storage medium having stored therein instructions that are executable by one or more hardware processors to perform operations comprising: listening for a broadcast signal from an edge station; joining a broadcast channel; receiving edge station information; selecting an edge station; transmitting a manifest to the selected edge station; receiving route information from the selected edge station; accessing a container identified in the route information; and issuing a call to the selected edge station to execute an application workload on the container.

Embodiment 2. The non-transitory storage medium as recited in embodiment 1, wherein the operations are performed at an end device.

Embodiment 3. The non-transitory storage medium as recited in any of embodiments 1-2, wherein the application workload is a process that is performable by an end device which hosts an application that originated the application workload.

Embodiment 4. The non-transitory storage medium as recited in any of embodiments 1-3, wherein the application workload comprises a process that is performable at a web site host which hosts an application that originated the application workload.

Embodiment 5. The non-transitory storage medium as recited in any of embodiments 1-4, wherein the application workload comprises a process that is performable by a microservice at a remote cloud site, and the operations further comprise replacing a remote URL to the microservice with a route provided in the route information.

Embodiment 6. The non-transitory storage medium as recited in any of embodiments 1-5, wherein the manifest is embedded either in an application native to an end device that transmitted the manifest, or is embedded in a website that was accessed by a browser of an end device.

Embodiment 7. The non-transitory storage medium as recited in any of embodiments 1-6, wherein the edge station information comprises information about a hardware configuration of the edge station.

Embodiment 8. The non-transitory storage medium as recited in any of embodiments 1-7, wherein the broadcast channel is identified by the broadcast signal.

Embodiment 9. The non-transitory storage medium as recited in any of embodiments 1-8, wherein communication with the edge station takes place either by way of an extension of a browser plugin of an end device, or by way of an SDK of an end device.

Embodiment 10. The non-transitory storage medium as recited in any of embodiments 1-9, wherein the operations further comprise transmitting a detach request to the edge station.

Embodiment 11. A non-transitory storage medium having stored therein instructions that are executable by one or more hardware processors to perform operations comprising: broadcasting a signal that includes information about an edge station; receiving, from an end device that detected the signal, a manifest that identifies a container of the edge station; executing the container identified in the manifest; sending route information concerning the container to the end device; receiving an 'attach' request from the end device; and in response to the 'attach' request, executing an application workload on the container at the edge station.

Embodiment 12. The non-transitory storage medium as recited in embodiment 11, wherein the operations are performed at the edge station.

Embodiment 13. The non-transitory storage medium as recited in any of embodiments 11-12, wherein the 'attach' request identifies the application workload that is to be executed.

Embodiment 14. The non-transitory storage medium as recited in any of embodiments 11-13, wherein the route information is usable by the end to device to access the container.

Embodiment 15. The non-transitory storage medium as recited in any of embodiments 11-14, wherein the application workload comprises a process that is performable at a web site host which hosts an application that originated the application workload.

Embodiment 16. The non-transitory storage medium as recited in any of embodiments 11-15, wherein the application workload comprise a process that is performable by a microservice at a remote cloud site.

Embodiment 17. The non-transitory storage medium as recited in any of embodiments 11-16, wherein as between the edge station and the end device, the application workload is performed only at the edge station.

Embodiment 18. The non-transitory storage medium as recited in any of embodiments 11-17, wherein the operations further comprise, prior to executing the container, downloading the container.

Embodiment 19. The non-transitory storage medium as recited in any of embodiments 11-18, wherein the operations further comprise performing an orchestration process that comprises: parsing the manifest to identify the application workload; and invoking an adapter to initialize and orchestrate the application workload.

Embodiment 20. The non-transitory storage medium as recited in any of embodiments 11-19, wherein the operations further comprise receiving a detach request from the end device and, in response to the detach request, stopping execution of the application workload at the edge station.

Embodiment 21. A method for performing any of the operations, methods, or processes, or any portion of any of these, disclosed herein.

Embodiment 22. A non-transitory storage medium having stored therein instructions that are executable by one or more hardware processors to perform the operations of embodiment 21.

L. Example Computing Devices and Associated Media

The embodiments disclosed herein may include the use of a special purpose or general-purpose computer including various computer hardware or software modules, as discussed in greater detail below. A computer may include a processor and computer storage media carrying instructions that, when executed by the processor and/or caused to be executed by the processor, perform any one or more of the methods disclosed herein, or any part(s) of any method disclosed.

As indicated above, embodiments within the scope of the present invention also include computer storage media, which are physical media for carrying or having computer-executable instructions or data structures stored thereon. Such computer storage media may be any available physical media that may be accessed by a general purpose or special purpose computer.

By way of example, and not limitation, such computer storage media may comprise hardware storage such as solid state disk/device (SSD), RAM, ROM, EEPROM, CD-ROM, flash memory, phase-change memory ("PCM"), or other optical disk storage, magnetic disk storage or other magnetic storage devices, or any other hardware storage devices which may be used to store program code in the form of computer-executable instructions or data structures, which may be accessed and executed by a general-purpose or special-purpose computer system to implement the disclosed functionality of the invention. Combinations of the above should also be included within the scope of computer storage media. Such media are also examples of non-transitory storage media, and non-transitory storage media also embraces cloud-based storage systems and structures, although the scope of the invention is not limited to these examples of non-transitory storage media.

Computer-executable instructions comprise, for example, instructions and data which cause a general purpose computer, special purpose computer, or special purpose processing device to perform a certain function or group of functions. Although the subject matter has been described in language specific to structural features and/or methodological acts, it is to be understood that the subject matter defined in the appended claims is not necessarily limited to the specific features or acts described above. Rather, the specific features and acts disclosed herein are disclosed as example forms of implementing the claims.

As used herein, the term 'module' or 'component' may refer to software objects or routines that execute on the computing system. The different components, modules, engines, and services described herein may be implemented as objects or processes that execute on the computing system, for example, as separate threads. While the system and methods described herein may be implemented in software, implementations in hardware or a combination of software and hardware are also possible and contemplated. In the present disclosure, a 'computing entity' may be any computing system as previously defined herein, or any module or combination of modules running on a computing system.

In at least some instances, a hardware processor is provided that is operable to carry out executable instructions for performing a method or process, such as the methods and processes disclosed herein. The hardware processor may or may not comprise an element of other hardware, such as the computing devices and systems disclosed herein.

In terms of computing environments, embodiments of the invention may be performed in client-server environments, whether network or local environments, or in any other suitable environment. Suitable operating environments for at least some embodiments of the invention include cloud computing environments where one or more of a client, server, or other machine may reside and operate in a cloud environment.

Figure 6:
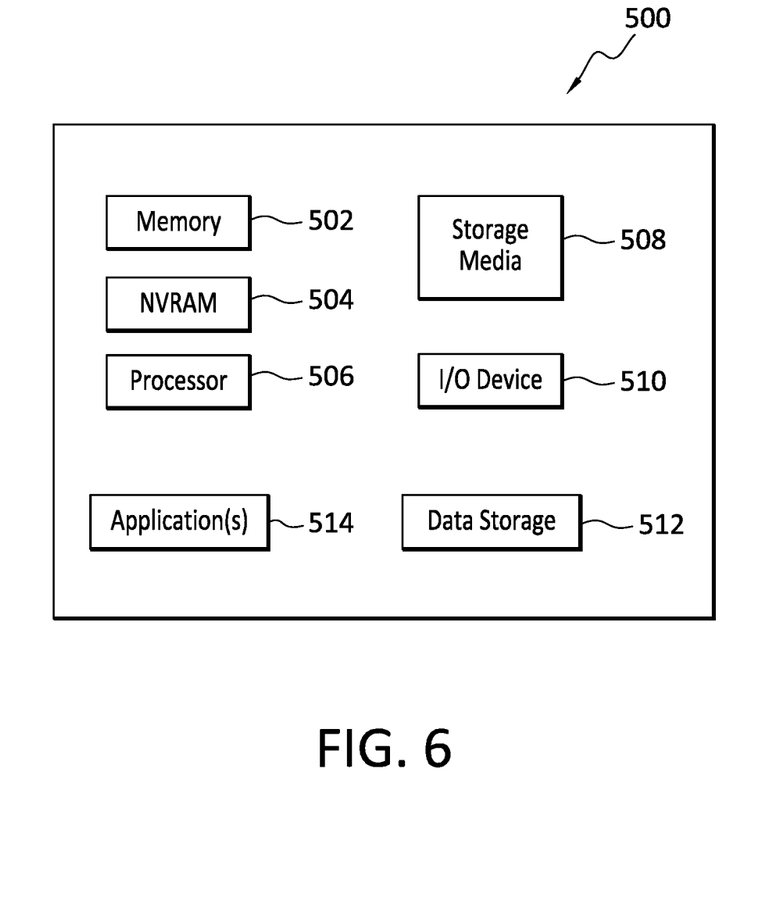
FIG. 6 discloses aspects of an example computing device.

With reference briefly now to FIG. 6, any one or more of the entities disclosed, or implied, by FIGS. 1-5 and/or elsewhere herein, may take the form of, or include, or be implemented on, or hosted by, a physical computing device, one example of which is denoted at 500. As well, where any of the aforementioned elements comprise or consist of a virtual machine (VM), that VM may constitute a virtualization of any combination of the physical components disclosed in FIG. 6.

In the example of FIG. 6, the physical computing device 500 includes a memory 502 which may include one, some, or all, of random access memory (RAM), non-volatile random access memory (NVRAM) 504, read-only memory (ROM), and persistent memory, one or more hardware processors 506, non-transitory storage media 508, UI device 510, and data storage 512. One or more of the memory components 502 of the physical computing device 500 may take the form of solid state device (SSD) storage. As well, one or more applications 514 may be provided that comprise instructions executable by one or more hardware processors 506 to perform any of the operations, or portions thereof, disclosed herein.

Such executable instructions may take various forms including, for example, instructions executable to perform any method or portion thereof disclosed herein, and/or executable by/at any of a storage site, whether on-premises at an enterprise, or a cloud storage site, client, datacenter, or backup server, to perform any of the functions disclosed herein. As well, such instructions may be executable to perform any of the other operations and methods, and any portions thereof, disclosed herein including, but not limited to, operations performed by and/or at the direction of an end device and/or an edge station. Such executable instructions may take various forms including, for example, instructions executable to perform any method or portion thereof disclosed herein, and/or executable by/at any of a storage site, whether on-premises at an enterprise, or a cloud storage site, client, datacenter, or backup server, to perform any of the functions disclosed herein. As well, such instructions may be executable to perform any of the other operations and methods, and any portions thereof, disclosed herein.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A non-transitory storage medium having stored therein instructions that are executable by one or more hardware processors to perform operations comprising:

listening, by an end device that is operable to communicate with a cloud site remote from the end device, and with one or more edge stations, for a broadcast signal from the one or more edge stations, wherein the broadcast signal indicates that one or more of the edge stations are available to perform computing services relating to an application hosted at the end device;

joining, by the end device, a broadcast channel;

receiving, at the end device by way of the broadcast channel, edge station information comprising information about the availability, and capabilities, of the one or more edge stations;

selecting, at the end device, an edge station to which a workload of the application will be migrated by the end device;

sending, by the end device, an 'attach' request, to the edge station, that requests execution of the workload by the edge station;

transmitting, by the end device, a manifest to the selected edge station, and the manifest identifies one or more containers needed to execute, at the edge station, the workload;

receiving, by the end device, route information from the selected edge station;

accessing, by the end device, the one or more containers, and the one or more containers are identified in the route information; and issuing, by the application hosted at the end device, a remote call to the selected edge station to execute the application workload with the one or more containers at the edge station.

2. The non-transitory storage medium as recited in claim 1, wherein another workload of the application is performed at the end device.

3. The non-transitory storage medium as recited in claim 1, wherein the application is a native to the end device.

4. The non-transitory storage medium as recited in claim 1, wherein the edge station information includes pricing information indicating a cost to for utilization of one of the edge stations to execute the workload.

5. The non-transitory storage medium as recited in claim 1, wherein the application workload comprises a process that is performable by a microservice at the cloud site, and the operations further comprise replacing a remote URL to the microservice with a route provided in the route information.

6. The non-transitory storage medium as recited in claim 1, wherein the manifest is embedded either in the application hosted by the end device that transmitted the manifest, or is embedded in a website that was accessed by a browser of the end device.

7. The non-transitory storage medium as recited in claim 1, wherein the information about the availability, and capabilities, of the one or more edge stations comprises information about a hardware configuration of one or more of the edge stations.

8. The non-transitory storage medium as recited in claim 1, wherein the broadcast channel is identified by the broadcast signal.

9. The non-transitory storage medium as recited in claim 1, wherein communication between the end device and the edge station takes place either by way of an extension of a browser plugin of the end device, or by way of an SDK of the end device.

10. The non-transitory storage medium as recited in claim 1, wherein the operations further comprise transmitting, by the end device, a detach request to the edge station.

11. A non-transitory storage medium having stored therein instructions that are executable by one or more hardware processors to perform operations comprising:
broadcasting, by an edge station to one or more end devices, a signal that includes information about an availability, and capabilities, of one of the edge stations to execute a workload of an application hosted at one of the end devices or at a website;
receiving, at the edge station, from an end device that detected the signal, a manifest that identifies a container of the edge station that is needed by the end device to execute the workload;
sending, by the edge station to the end device, route information concerning the container to the end device;
receiving, at the edge station, an 'attach' request from the end device; and
in response to the 'attach' request, executing, at the edge station, the workload using the container at the edge station.

12. The non-transitory storage medium as recited in claim 11, wherein the edge station is a private edge station that is accessible by the end device.

13. The non-transitory storage medium as recited in claim 11, wherein the 'attach' request identifies the application workload that is to be executed.

14. The non-transitory storage medium as recited in claim 11, wherein the route information is usable by the end to device to access the container.

15. The non-transitory storage medium as recited in claim 11, wherein after the workload has executed at the edge station, the workload is detached from the edge station, and edge station resources that were used to execute the workload are freed for use with one or more other workloads.

16. The non-transitory storage medium as recited in claim 11, wherein the workload comprises a process that is performable by a microservice at a cloud site that is remote from the end device.

17. The non-transitory storage medium as recited in claim 11, wherein as between the edge station and the end device, the workload is performed only at the edge station, and another workload of the application is performed at the end device.

18. The non-transitory storage medium as recited in claim 11, wherein the operations further comprise, prior to executing the container, downloading a container image of the container, and the executing and the downloading are elements of an orchestration process performed by the edge station.

19. The non-transitory storage medium as recited in claim 18, wherein the an orchestration process further comprises:
parsing the manifest to identify the workload; and
invoking an adapter to initialize and orchestrate the workload.

20. The non-transitory storage medium as recited in claim 11, wherein the operations further comprise receiving, by the edge station, a detach request from the end device and, in response to the detach request, stopping execution of the application workload at the edge station.

* * * * *